INVENTOR.
WALTER B. NICHOLS

INVENTOR.
WALTER B. NICHOLS
BY Alfred R. Fuchs
ATTORNEY

United States Patent Office 2,782,734
Patented Feb. 26, 1957

2,782,734

OBLIQUE CURLING LOAF MOLDERS

Walter B. Nichols, Kansas City, Mo., assignor to Stickelber & Sons, Inc., a corporation of Missouri Application May 8, 1951, Serial No. 225,205

The portion of the term of the patent subsequent to August 4, 1970, has been disclaimed 4 Claims. (Cl. 107—9)

My invention relates to loaf molding mechanisms for molding loaves of bread and similar bakery products, and more particularly to a loaf molding mechanism in which the curling or coiling up of the dough piece is in a different direction than lengthwise of the sheeted dough piece.

It has been found desirable to improve the texture of loaves of bread to curl the sheeted pieces of dough from which the loaf is molded in a direction different from that in which the piece of dough has been sheeted. Such curling of the sheeted pieces of dough results in a more uniform grain in the baked loaf, eliminating the large holes that develop in the loaf during the proofing operation, when curling is done in the same direction as the dough piece is sheeted.

My improved loaf molding mechanism curls the sheeted dough pieces in a direction that is at an oblique angle to that in which the dough pieces have been sheeted, instead of at right angles thereto, as has been customary with transverse curling loaf molding mechanisms. This accomplishes the above referred to advantages and avoids some of the disadvantages existing in transverse curling mechanisms known prior to my invention.

In all loaf molding mechanisms it is desirable that the molded loaves be delivered to pans automatically so that the molded loaves will be received in the pans in such a manner that no portion of the molded loaf overlaps the end of the pan or so that the molded loaf is located with its opposite ends at the same uniform spacing from the ends of the pan. In order that this can be accomplished, it is necessary that the sheeted dough pieces, that are to be curled up on themselves to form the molded loaf, be all placed at the same location transversely of the conveyor belt, that serves as part of the curling means and delivery means for the molded loaves of bread to the pans. It has been found that the only way that a sheeted dough piece can be delivered to such a conveyor belt from one side thereof in a direction transversely across the belt, and locate each succeeding dough piece in the same position transversely of the belt, is to project the sheeted dough piece from a conveyor receiving the sheeted dough pieces from the sheeting mechanism across the curling conveyor belt in a direction substantially parallel to the top surface of said belt and provide means for halting this transverse projection of the sheeted dough piece at a predetermined point crosswise of the belt.

Prior to my invention, this has been accomplished by providing a stop member that extends substantially parallel to the one side edge of the curling conveyor belt with which the projected dough pieces engage to stop the dough pieces at a predetermined location crosswise of the belt so that each succeeding dough piece will have the same position, crosswise of the curling conveyor belt, upon delivery thereto, said means being disclosed in the application of Merlin A. Sticelber, Serial No. 4,294, filed January 26, 1948, now Patent No. 2,647,612, on Transverse Curling Loaf Molding Mechanism.

While such an apparatus as disclosed in said application will locate the dough pieces definitely crosswise of the curling conveyor belt, the engagement of the then forward end of the sheeted dough piece with the stop member thickens the sheeted dough piece somewhat along the edge that engaged the stop member. Due to the fact that the dough piece is extremely soft and plastic, it has a straight edge portion formed along the margin at which it engaged with the stop member, which will slide along the stop member as the dough piece is conveyed lengthwise of the stop member by the curling conveyor belt, tending to somewhat roughen the edge of the sheeted dough piece that engages this stop member, making said edge somewhat ragged. Also, miniature balls will be formed from dough stripped off said edge of the sheeted dough piece as it slides along the stop member and said edge has a tendency to adhere or drag along the stop member, which may cause the dough piece to swing out of its desired position on the curling conveyor belt.

It is one of the principal purposes of my invention to avoid any lack of uniformity in the thickness of the molded loaf at opposite ends thereof, any ragged edge on the sheeted dough piece where it engages the stop member, and any dragging of the dough piece on the stop member and to obtain uniform placement of the dough pieces on the curling conveyor belt.

I accomplish this purpose by providing a stop member that extends at an oblique angle to the direction of travel of the curling conveyor belt. While a preferred angle is shown in the drawings, the angle can be varied considerably therefrom and the desired result accomplished, as long as the portion of the stop member engaged by the sheeted dough piece extends at an oblique angle to the direction in which the curling conveyor belt travels and the angle is not so great relative to the direction in which the dough piece is projected across the conveyor belt that it will slide along the stop member instead of being halted thereby. Furthermore the angularity has to be such that the stop member diverges relative to the marginal side edge of the curling conveyor belt from which the sheeted dough piece has been projected onto the same, the divergence being in the direction of travel of the curling conveyor belt.

It is a further purpose of my invention to provide deflecting means associated with said stop member so as to assure the flat engagement of the sheeted dough piece with the curling conveyor belt. The tendency is, under certain circumstances, for the last end of the sheeted dough piece, leaving the conveying means that projects said sheeted dough piece across the curling conveyor belt, to deflect or whip slightly upwardly away from the curling conveyor belt after it has left the conveying means. By providing a deflector plate extending downwardly toward said stop plate in the direction of feed of said sheeted dough pieces to said curling conveyor belt, this is avoided and said sheeted dough pieces are fed flatwise into position on the curling conveyor belt. It is a purpose of my invention to provide new and improved means for mounting said deflecting means for adjustment of the angularity thereof and spacing thereof relative to the curling conveyor belt.

One of the important advantages of my invention is that when a sheeted dough piece is projected across the curling conveyor belt from one side thereof from the sheeting mechanism, one corner thereof will first engage the obliquely extending stop member adjacent the nearest end of the stop member to the side of the conveyor belt from which feeding has taken place. Then the sheeted dough piece will turn on the curling conveyor belt into a position in which a large portion of one side thereof is in engagement with the obliquely extending stop member, thus forming a slightly curved edge on the sheeted dough piece where such engagement takes place, which approaches a straight line. Immediately after this has taken place, the dough piece will completely disengage the stop member because the curling conveyor belt will carry it in a direction away from the stop member in its movement toward the curling means. The sheeted dough piece will then be located at an angle to the position that it had when it first engaged the stop member, the last end leaving the sheeting mechanism being moved somewhat forwardly from the position it would have had if it had merely been stopped by a stop member running parallel to the length of the curling conveyor belt.

Thus, instead of the sheeted dough piece being curled up on itself in a direction perpendicular to that in which it was sheeted, it will be curled up on itself in a direction at an oblique angle to that in which it was sheeted, and the edge that had engaged the stop member, which was the forward edge, which had the driest surface after sheeting, will be extending spirally in the curled up loaf so that there will not be a dry surfaced edge coiled upon itself at the end of the molded loaf from the center to the outermost surface thereof, which would result in poor texture in that end of the loaf. Instead, the dry surfaced edge portion will be distributed throughout a portion of the molded loaf extending inwardly from one end thereof a distance dependent upon the angle at which the stop member extends relative to the direction of travel of the curling conveyor belt. If the angle is kept a relatively small acute angle, the tapered ends resulting from such oblique curling will be turned back when the curled or coiled up dough piece engages the guides provided at the opposite ends of the curled up dough pieces either while in engagement with the curling member or the pressure board, causing redistribution of the dough mass at the ends of the loaf so that the molded loaf will be of the same diameter or thickness from end to end thereof after passing under the pressure board and will make a baked loaf of uniform size from adjacent one end to adjacent the other end thereof, while at the same time avoiding any dry spots in any one transverse section of the loaf due to the dry surfaced end edge of the sheeted dough piece that was the forward edge of the sheeted dough piece as it was delivered to the curling conveyor belt.

In a bread molding machine that automatically sheets, curls and pans the loaves, it is necessary, in order to get a satisfactory product, that the closing seam of the curled up piece of dough be on the under side of the loaf in engagement with the pan. As the action of the pressure board in compacting the coiled up dough piece causes a rolling over of the coiled up dough piece the same number of times for each succeeding piece of dough that passes under the same, the point at which this closing seam is located when the curling or coiling operation is completed determines the position of the closing seam when the molded loaf is deposited in the pan. It is a purpose of my invention to provide new and improved means for mounting a flexible coiling or curling member cooperating with the conveyor belt so that the legnth thereof that engages with the conveyor belt can be readily adjusted and that adjustment maintained. By adjusting the length of flexible curling member in engagement with the conveyor belt the position of the closing seam in the panned molded loaf can be determined and when once properly adjusted all succeeding loaves molded by the machine will be deposited in the pan with the closing seam in the same position.

Other objects and advantages of my invention will appear as the description of the drawings proceeds. I desire to have it understood, however, that I do not intend to limit myself to the particular details shown or described, except as defined in the claims.

Figure 1:
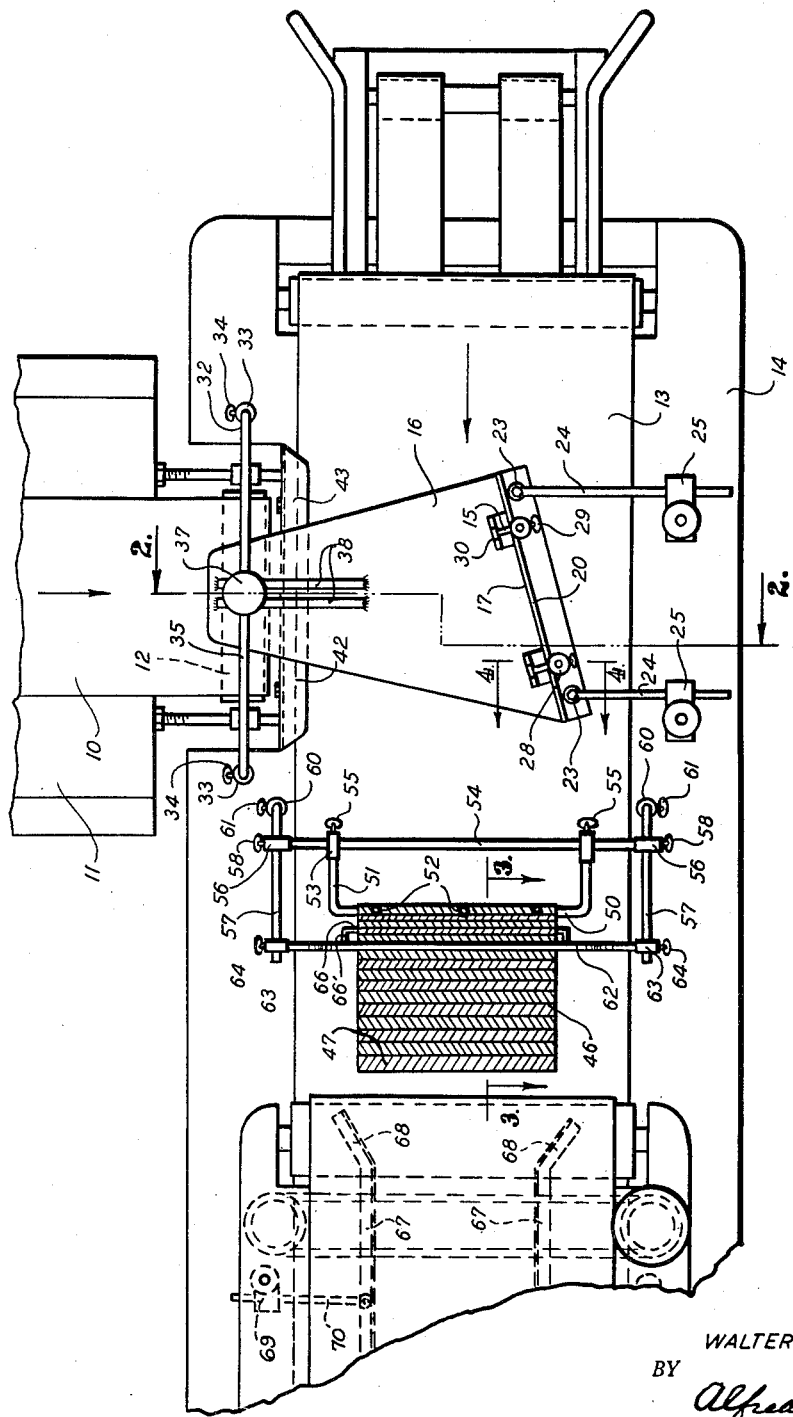
Fig. 1 is a top plan view of my improved loaf molding mechanism, partly broken away.

Referring in detail to the drawings, in Fig. 1 is shown a portion of a bread molding machine that has a conveyor belt 10 mounted on a suitable frame 11 and operating over a roller 12, which is adjustably mounted on the frame, said conveyor belt extending from a suitable sheeting mechanism, which is not shown, but which may be of any standard or desired character. The conveyor belt 10 travels in a direction indicated by the arrow in Fig. 1 and discharges pieces of sheeted dough therefrom across the conveyor belt 13, which operates in the direction of the arrow as shown in Fig. 1. The sheeted dough pieces carried along by the conveyor belt 10 are traveling along thereon in the direction in which these were sheeted and said belt discharges or projects said pieces of dough with considerable momentum across the conveyor belt 13. The conveyor belt 13 extends across the table-like member 14, which is mounted on a suitable frame.

Figure 4:
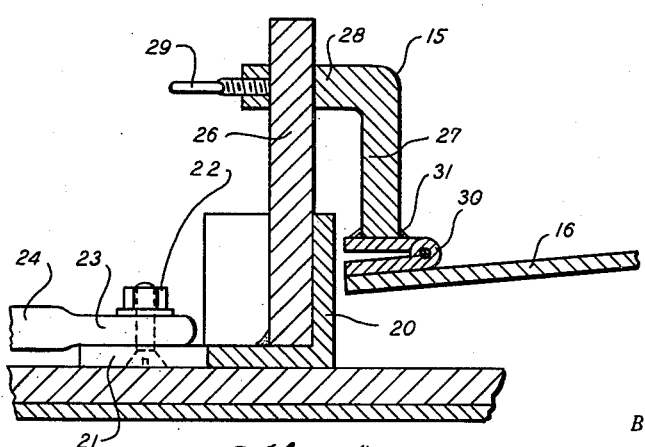
Fig. 4 is an enlarged fragmentary vertical section, taken on the line 4—4 of Fig. 1, showing the mounting of the stop member.

The tendency is, under certain circumstances, for the last end of the sheeted dough piece leaving the conveying means 10, which projects said sheeted dough pieces across the curling conveyor belt 13, to deflect or whip slightly upward away from the curling conveyor belt after it has left the conveying means 10. In order to prevent undesirable upward movement of the sheeted dough pieces away from the conveyor belt 13, which might prevent the flatwise engagement of the sheeted piece of dough with the conveyor belt 13 when the same finally engages therewith, a stop or deflector plate 16 is provided, which extends across a large portion of the width of the conveyor belt 13. The plate 16 is generally triangular in character, having a marginal edge 17, which is at an oblique angle to the direction of travel of the curling conveyor belt 13, and the end having said edge is of substantially the width of the belt 10. A stop means is provided, comprising a horizontally extending angular guide member which has a vertical flange 20 and horizontal flange 21 that is pivotally connected to the rod-like members 24, said rod-like members having enlargements or heads 23 on the ends thereof, which are secured to the horizontal flange 21 by means of the fastening elements 22. This is best seen in Fig. 4. The rods 24 are mounted in clamping members 25, which are secured to the table portion 14 and held securely thereby, as described and shown in detail in the application of Merlin A. Sticelber, Serial No. 4,294, filed January 26, 1948, now Patent No. 2,647,612, on Transverse Curling Loaf Molding Mechanism. This provides transverse adjustment of the stop means 20 to locate the sheeted dough piece at any desired position on the conveyor belt. The horizontal flange 21 of the stop means rides lightly on the conveyor belt 13 during the operation of the machine. The vertical angular guide member 20 lies parallel and adjacent the oblique marginal edge 17 of the deflecting plate 16 and also lies at an oblique angle to the direction of travel of the conveyor belt 13.

Figure 2:
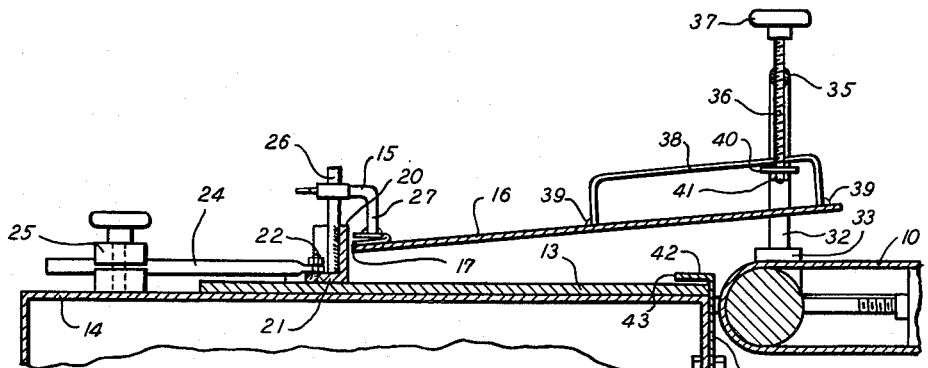
Fig. 2 is an enlarged vertical section, taken on the line 2—2 of Fig. 1, showing the stop member.

The deflecting plate 16 is attached to the guide member 20 in the following manner: Two vertical posts 26 are welded to the vertical flange of the guide members 20, as shown in Fig. 4. Angle brackets 15, each made of a rod-like member 27, which has an enlarged end 28, are adjustably mounted on vertical posts 26, as shown in Figs. 2 and 4. The vertical post 26 projects through the enlarged end 28 of the member 27, which is slidably mounted on said vertical post 26, as shown in Fig. 4, and a thumb screw 29 is engaged in a threaded opening therein. Thus the member 27 may be adjusted vertically on the post 26 and may be clamped in any desired position by the thumb screw 29. The lower ends of the members 27 are welded to hinge-like members 30 at 31. The hinge-like member 30 is also welded to the deflecting plate 16, as shown in Fig. 4.

The deflecting plate 16 is mounted at its forward end in the following manner: A rod-like supporting member 32 has leg portions fastened to the table-like portion 14 at their lower ends in the bosses 33 attached rigidly to the table-like portion 14, thumb screws 34 clamping the legs of the rod-like member 32 securely in the bosses 33. The rod-like member 32 has a horizontal portion 35, which extends across and above the conveyor belt 10, in spaced relation thereto. An adjusting member 36 passes through an opening in the horizontal portion 35 of the supporting member 32 and is screw-threadedly engaged therewith. The member 36 is provided with a knob 37 at its upper end. The deflecting plate 16 has two U-shaped strips 38 spaced to provide a slot through which the adjusting member 36 passes, said strips 38 having foot portions 39 welded to the deflecting plate 16. Thus a bracket providing a guide slot spaced from the plate 16 is provided. A washer 40, which is substantially larger than the slot existing between the strips 38, is fastened to the lower end of the adjusting means 36 by the nut 41. This is most clearly shown in Fig. 2.

By the above mentioned means, the marginal edge 17 of the deflecting plate 16 may be adjusted vertically by the adjusting means 15 to have the plate 16 at a desired distance from the belt 13 at its lower end, and also the deflecting plate 16 may be adjusted at its upper end, at which the sheeted dough pieces enter between it and the belt by the member 36 to get the desired angularity.

As seen in Fig. 2, a deflecting guard plate 42 is provided, which has a horizontal portion 43, which projects over the conveyor belt 13, and a vertical portion 44, by which it is attached to the table-like portion 14 by the fastening elements 45. The deflecting plate 42 prevents dough pieces, which are projected off of the conveyor belt 10, from striking the moving edge of the conveyor belt 13.

Sheeted pieces of dough, which have been located on the conveyor belt 13 at a definite spacing from the marginal edges thereof by the stop means 20, pass under the flexible curling member or chain 46. The flexible curling member 46 is of flexible chain mesh material and has its lower extremity 47 dragging on the conveyor belt 13 so that when the sheeted dough pieces engage therewith the leading edges of said dough pieces will be turned over on the dough piece and this curling over action will continue until the dough piece has been completely curled up after having passed completely under the curling member 46.

Adjusting means is provided for the flexible curling member 46, which is to be described in detail, which varies the effective length of the curling chain 46 to allow for variations in the size of the sheeted dough piece for different loaf sizes or for different textures of dough. The adjustable mounting for the curling chain 46 may be seen most clearly in Fig. 3. The curling chain 46 is mounted at its upper end on the horizontal transversely extending portion 50 of the U-shaped bar 51 by the pins 52, which are mounted in fixed position thereon. The U-shaped bar 51 is provided with enlarged ends or heads 53, through which a horizontal support bar 54 passes. The bar 51 is thus mounted on the bar 54 for swinging movement and can be adjusted at any desired angle and held in adjusted position by the thumb screws 55. The support bar 54 is also provided with enlarged ends or heads 56, through which the longitudinally extending bars 57 pass. Thumb screws 58 are provided in the enlarged ends 56 to clamp the bar 54 to the bars 57 in any adjusted position to which the same may be slid on the bars 57 for adjustment of the chain 46 lengthwise of the conveyor belt 13. The bars 57 have depending vertical portions 59, which extend into the bosses 60 mounted in fixed position on the table-like member 14 and are held clamped in position by the thumb screws 61.

Also mounted on the bars 57 is a guide member 62, which has enlarged ends or heads 63, through which the bars 57 pass, being adjustable lengthwise of the bars 57 and secured thereto in adjusted position by the thumb screws 64. The guide member 62 has a transversely extending horizontal bar-like portion 65. A U-shaped rod-like member 66, smaller than the portion 65, is welded at each end 66' to the horizontal rounded bar-like portion 65 of the guide member 62, the ends 66' serving to space the bar 66 from the bar 15 to provide sufficient clearance between the members 66 and 65 to allow the curling chain 46 to fit loosely between the two members. The pull of the belt 13 on the curling member 46 will cause the member 46 to engage the bar 65 and the effective length of the curling chain 46 will be determined by its point of engagement with said bar 65. The position of the member 46 lengthwise of the conveyor belt 13 can thus be adjusted by varying the angle of the bars 51 and also by varying the position of the bars 54 and 62 on the bars 57, and its effective length on the belt 13 by adjusting the position of the bar 65 relative to the bar 50.

The curled up dough piece, after passing under the curling chain 46, is carried by the conveyor belt 13 to the pressure board 49, which is of well known construction. Guides 67 (see Fig. 1) are provided beneath the pressure board 49, having outwardly flaring ends 68 to direct the dough piece as it starts its movement under the pressure board 49. The guides 67 are mounted in a similar fashion to the stop means 20 and are fastened rigidly to the table-like member 14 by the clamping members 69 and the rod-like members 70, which are of the same type as the clamping members 25 and rod-like members 24 previously described.

Figure 5:
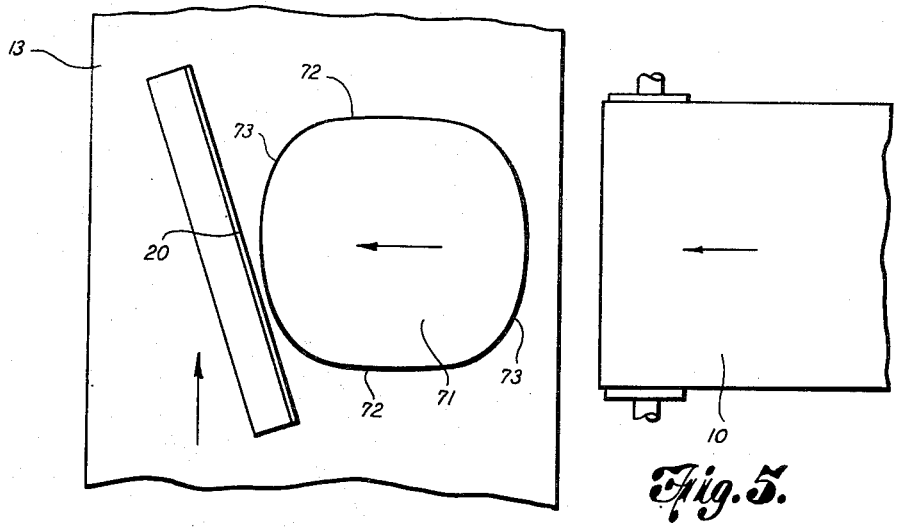
Fig. 5 is a fragmentary schematic plan view, showing the sheeted dough piece just before it makes contact with the stop member.

In the operation of my oblique curling loaf molder, sheeted dough pieces are discharged with considerable momentum from the conveyor belt 10 onto the conveyor belt 13. The sheeted dough piece 71, as it is discharged from the sheeting mechanism, has substantially parallel side edges 72 and rounded ends 73. This is the shape of the dough piece 71 as it is projected across the conveyor belt 13 from the conveyor belt 10 as seem in Fig. 5 just before making contact with the stop member 20. The arrow, as shown on the dough piece 71 in Fig. 5, shows the direction in which the sheeting of the dough piece has taken place. As the sheeted dough piece 71 moves from the position shown in Fig. 5 into contact with the stop member 20, which lies at an oblique angle to the direction of travel of the conveyor belt 13, the rounded end 73 is flattened and thickened upon engagement with the stop means 20 because of the force with which it strikes the stop means after being discharged from the conveyor belt 10. The dough piece, being then in contact with the stationary stop means 20, and the conveyor belt 13, moving as indicated by the arrow thereon in Fig. 5, is rotated slightly on the belt 13, and further flattened and thickened along the edge that engages the stop means 20.

Figure 6:
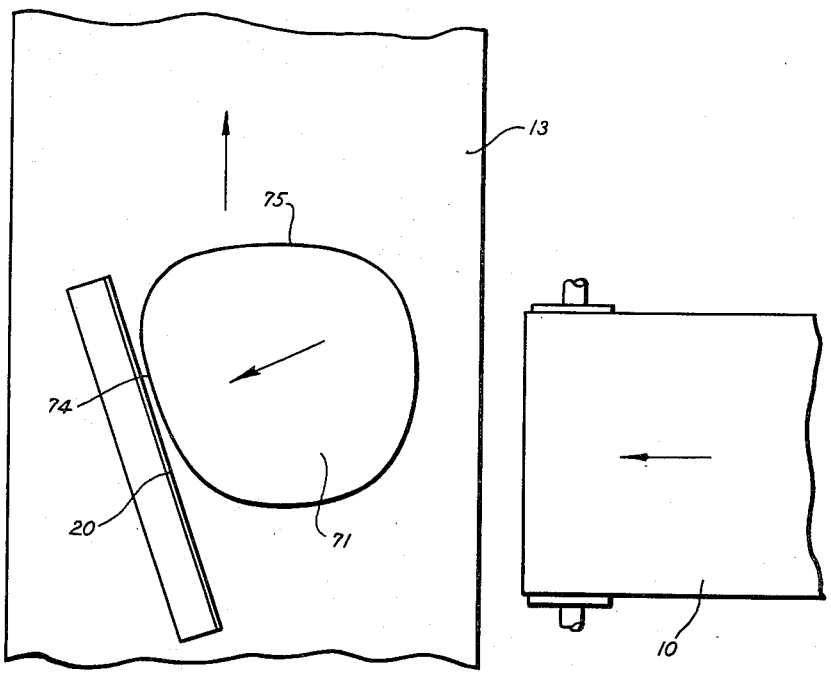
Fig. 6 is a fragmentary schematic plan view, showing the sheeted dough piece just after it has made contact with the stop member.

The flattened edge resulting on the dough piece 71 is indicated at 74. The dough piece is rotated until the direction of original sheeting is as indicated by the arrow in Fig. 6, said direction being slightly more than 90° to the face of the stop means 20. The dough piece is then shaped as shown in Fig. 6, with the edge 74 approaching a straight line, and at a definite location transversely of the belt 13. The succeeding dough pieces are then almost identical in shape and positioned identically on the conveyor belt 13 by the stop means 20, before the curling process is started.

Figure 3:
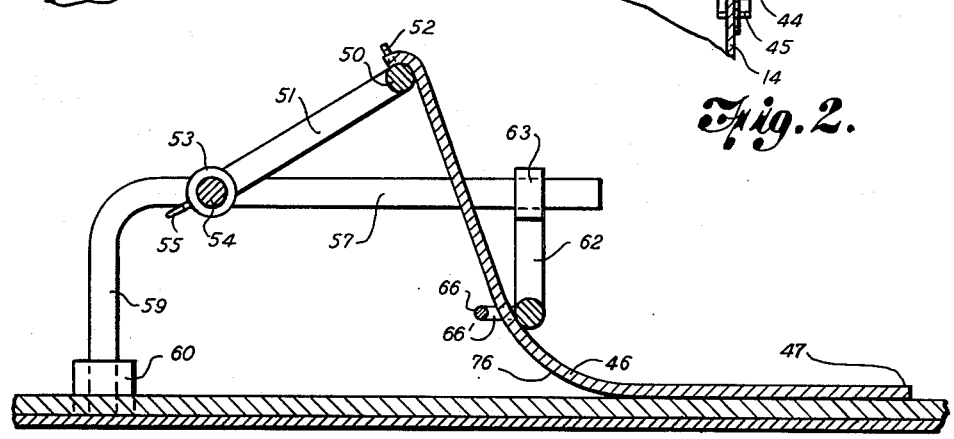
Fig. 3 is an enlarged vertical section, taken on the line 3—3 of Fig. 1, showing the improved curling chain mounting.

The leading edge 75 of the dough piece 71 is turned over in a well known manner by contact with the curling chain 46 at 76, as seen in Fig. 3. The turning over or coiling up process is continued until the curled up dough piece passes under the trailing edge 47 of the curling chain. As seen by the arrow indicating the direction of original sheeting in Fig. 6, and the position of the dough piece 71 on the conveyor belt 13, the curling which takes place around an axis perpendicular to the direction of travel of the conveyor belt occurs obliquely to the direction of original sheeting. The effective length of the curling chain, that is from 76 to 47 in Fig. 3, may be varied by changing the angle of the bars 51, which are adjustable on the support bar 54. Thus the closing seam 48 of the dough piece, as seen in Fig. 7, may be definitely located in the bottom of the pan by adjustment of the effective length of the curling chain.

Figure 7:
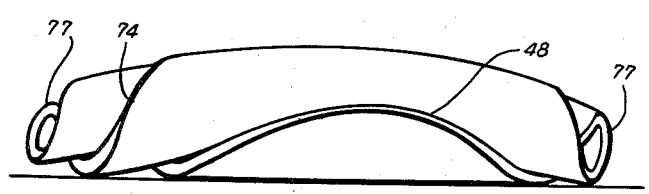
Fig. 7 is an elevation of the dough piece after it has passed under the curling chain and just before it engages the pressure board guide.

The curled up piece of dough, shown in Fig. 7 before it is passed under the pressure board, is carried by the conveyor belt 13 into contact with the stationary pressure board where the dough piece is again rolled over. As the rolling piece of dough makes contact with the outwardly extending portions 68 of the guides 67 the tapered ends 77 of the dough piece are turned backward, and then rolled under the dough piece as it passes under the pressure board. The length of the molded dough piece is fixed by the distance between the guides 67 as adjusted by the rod-like members 70 and the clamping members 69.

It will be noted that the edge 74 of the dough piece, which was the leading edge thereof as it left the curling mechanism and passed onto the curling conveyor belt 13, and which has a rather dry surface, is arranged in a spiral in the coiled or curled up piece of dough and is further turned back on itself by the guides leading under the pressure board, so as to distribute these dry surfaced edge portions over a large area and place the same in contact with the moistened surfaced body portion of the sheeted dough piece, to thus eliminate dry spots from the finished loaf.

What I claim is:

1. In a molding machine, a conveyor belt, feeding means discharging sheeted dough pieces crosswise of said conveyor belt onto the same from one side thereof, a stop member over said belt extending obliquely to the direction of travel thereof in the discharge path of said dough pieces to limit movement thereof transversely of said belt, and a deflector plate extending over said feeding means at its discharged end and over said conveyor belt from adjacent said side thereof to adjacent said stop member, said deflector inclining downwardly toward said stop member.

2. In a molding machine, a conveyor belt, feeding means discharging sheeted dough pieces crosswise of said conveyor belt onto the same from one side thereof, a stop member over said belt extending obliquely to the direction of travel thereof in the discharge path of said dough pieces to limit movement thereof transversely of said belt, a deflector plate extending over said conveyor belt from adjacent said side thereof to adjacent said stop member, said deflector plate inclining downwardly toward said stop member, and means for adjusting the inclination and spacing of said deflector plate from said belt including a hinged connection between said stop member and deflector plate.

3. In a molding machine, a conveyor belt, feeding means discharging sheeted dough pieces in a path extending crosswise of the direction of travel of said conveyor belt onto the same from one side thereof, and a member for locating said dough pieces in an obliquely extending position on said belt between the side edges thereof, comprising a horizontally elongated upstanding wall lying between the side edges of said belt and extending upwardly from adjacent the top face thereof across the discharge path of said dough pieces and having one end thereof nearer the side of said belt from which said dough pieces are fed than the other end thereof, said wall receding from the side of said belt from which said sheeted dough pieces are fed in the direction of travel of said belt.

4. In a molding machine, means for curling dough pieces sheeted in a predetermined direction obliquely to the direction in which the same were sheeted, comprising a conveyor belt, a flexible curling member cooperating therewith, means for feeding said sheeted dough pieces in a path extending crosswise onto said belt and a horizontally elongated upstanding wall in the path of feed of said dough pieces lying between the side edges of said belt adjacent its top face, said wall having one end thereof located nearer one side of said belt than the other end thereof and receding from the side of said belt from which said sheeted dough pieces are fed in the direction of travel of said belt.

References Cited in the file of this patent

UNITED STATES PATENTS

| | | |
|---|---|---|
| 1,581,583 | Low | Apr. 20, 1926 |
| 1,657,018 | Larraburu | Jan. 24, 1928 |
| 1,898,794 | Spiess | Feb. 21, 1933 |
| 2,021,251 | Brykczynski et al. | Nov. 19, 1935 |
| 2,320,797 | Robinson | June 1, 1943 |
| 2,373,012 | Burdett et al. | Apr. 3, 1945 |
| 2,391,691 | Engels | Dec. 25, 1945 |
| 2,534,734 | Rhodes | Dec. 19, 1950 |
| 2,647,612 | Sticelber | Aug. 4, 1953 |

FOREIGN PATENTS

| | | |
|---|---|---|
| 21,480 | France | July 6, 1920 |
| (1st addition to No. 501,285.) | | |